(12) United States Patent
Commaret et al.

(10) Patent No.: US 8,047,777 B2
(45) Date of Patent: Nov. 1, 2011

(54) TURBOMACHINE DIFFUSER

(75) Inventors: Patrice Andre Commaret, Rubelles (FR); Michel Andre Albert Desaulty, Vert St Denis (FR); Romain Nicolas Lunel, Montereau sur le Jard (FR); Pascale Rollet, Le Plessis Pate (FR)

(73) Assignee: SNECMA, Paris (FR)

( * ) Notice: Subject to any disclaimer, the term of this patent is extended or adjusted under 35 U.S.C. 154(b) by 689 days.

(21) Appl. No.: 12/190,105

(22) Filed: Aug. 12, 2008

(65) Prior Publication Data
US 2009/0047127 A1    Feb. 19, 2009

(30) Foreign Application Priority Data
Aug. 13, 2007  (FR) ..................... 07 57050

(51) Int. Cl.
F04D 29/44 (2006.01)
F04D 29/54 (2006.01)
F03B 1/00 (2006.01)
F03B 11/02 (2006.01)
F03B 5/00 (2006.01)

(52) U.S. Cl. ..................... 415/208.4; 415/208.3; 60/751
(58) Field of Classification Search ............... 415/208.2, 415/208.3, 208.4, 211.2, 224.5; 60/751
See application file for complete search history.

(56) References Cited

U.S. PATENT DOCUMENTS

| | | | |
|---|---|---|---|
| 4,901,522 A | 2/1990 | Commaret et al. | |
| 5,317,863 A | 6/1994 | Ciccia et al. | |
| 5,592,819 A | 1/1997 | Ansart et al. | |
| 5,651,252 A | 7/1997 | Ansart et al. | |
| 6,279,322 B1 * | 8/2001 | Moussa | 60/751 |
| 6,959,551 B2 | 11/2005 | Baudoin et al. | |
| 7,101,173 B2 | 9/2006 | Hernandez et al. | |
| 2002/0146320 A1 * | 10/2002 | Moussa et al. | 415/208.3 |
| 2004/0011058 A1 | 1/2004 | Baudoin et al. | |
| 2007/0113557 A1 * | 5/2007 | Schumacher et al. | 60/751 |

(Continued)

FOREIGN PATENT DOCUMENTS

EP    1 788 310 A2    5/2007

(Continued)

OTHER PUBLICATIONS

J. W. Sanborn, et al., "Advanced Turbofan Engine Combustion System Design and Test Verification", Journal of Propulsion and Power, vol. 5, No. 4, XP000068028, Jul. 1, 1989, pp. 502-509.

(Continued)

Primary Examiner — S. V Clark
(74) Attorney, Agent, or Firm — Oblon, Spivak, McClelland, Maier & Neustadt, L.L.P.

(57) ABSTRACT

A turbomachine comprising an annular combustion chamber (40) with injection orifices (44); a centrifugal compressor (10) having a centrifugal downstream stage and an annular diffuser (20) comprising: a radially-oriented upstream portion (21) with diffusion passages (22) connected to the outlet of the compressor and an elbow-shaped intermediate portion (24) and a downstream portion (25) comprising a series of flow-straightening vanes (26) and inclined relative to the axis (A) of the turbomachine. In the section plane containing the axis (A) of the turbomachine and passing via the center (C) of one of said injection orifices (44), the curvilinear abscissa distance along a flow line (L) between the middle (0) of the flow path at the trailing edges of the flow-straightening vanes (26) and said center (C) is greater than or equal to three times the height (h) of said flow path.

2 Claims, 5 Drawing Sheets

U.S. PATENT DOCUMENTS

| | | |
|---|---|---|
| 2007/0125085 A1 | 6/2007 | Commaret et al. |
| 2007/0183890 A1 | 8/2007 | Nolcheff et al. |
| 2007/0193248 A1 | 8/2007 | Bessagnet et al. |
| 2007/0269757 A1 | 11/2007 | Commaret et al. |
| 2008/0000234 A1 | 1/2008 | Commaret et al. |
| 2008/0019828 A1 | 1/2008 | Commaret et al. |
| 2008/0072603 A1 | 3/2008 | Commaret et al. |
| 2008/0075588 A1* | 3/2008 | Belmonte ................ 415/209.3 |
| 2008/0121301 A1* | 5/2008 | Norris ........................... 138/39 |
| 2008/0141674 A1 | 6/2008 | Commaret et al. |
| 2008/0141680 A1 | 6/2008 | Brunet et al. |
| 2008/0155988 A1 | 7/2008 | Commaret et al. |
| 2008/0178598 A1 | 7/2008 | Commaret et al. |
| 2008/0245053 A1 | 10/2008 | Commaret et al. |
| 2009/0100839 A1 | 4/2009 | Cazalens et al. |
| 2009/0100840 A1 | 4/2009 | Campion et al. |
| 2010/0031663 A1* | 2/2010 | Commaret et al. ............ 60/751 |
| 2010/0229562 A1* | 9/2010 | Zupanc et al. ................ 60/751 |

FOREIGN PATENT DOCUMENTS

FR            2 372 965        6/1978

OTHER PUBLICATIONS

U.S. Appl. No. 12/165,995, filed Jul. 1, 2008, Commaret, et al.
U.S. Appl. No. 12/173,945, filed Jul. 16, 2008, Commaret, et al.
U.S. Appl. No. 12/177,274, filed Jul. 22, 2008, Commaret, et al.
U.S. Appl. No. 12/198,386, filed Aug. 26, 2008, Commaret, et al.

* cited by examiner

TURBOMACHINE DIFFUSER

FIELD OF THE INVENTION

The invention relates to a turbomachine. It is applicable to any type of terrestrial or aviation turbomachine, and it is more particularly applicable to airplane turbojets.

In the present application, "upstream" and "downstream" are defined relative to the normal flow direction of gas in turbomachine (from upstream to downstream). Furthermore, the axis of the turbomachine is the axis of rotation of the turbomachine rotor. The axial direction corresponds to the direction of the turbomachine axis, and a radial direction is a direction perpendicular to said axis. Similarly, an axial plane is plane containing the turbomachine axis, and a radial plane is a plane perpendicular to said axis. Finally, unless specified to the contrary, adjectives such as "inner" and "outer" are used relative to a radial direction such that an inner portion (i.e. a radially inner portion) of an element is closer to the axis of the turbomachine than is an outer portion (i.e. the radially outer portion) of the same element.

The invention relates to the turbomachine of the type comprising:
- an annular combustion chamber with a chamber end wall presenting injection orifices having injection systems mounted therein;
- a compressor having a centrifugal downstream stage; and
- an annular diffuser enabling the flow of gas leaving the compressor to be diffused and directing this flow of gas towards said injection systems.

BACKGROUND OF THE INVENTION

A compressor having a centrifugal downstream stage usually includes a rotary impeller. The impeller comprises a series of blades driven in rotation, and it is made in such a manner as to accelerate the gas passing therethrough.

The diffuser presents an annular space surrounding the impeller. The diffuser serves to reduce the speed of the gas leaving impeller, and as a result to increase its static pressure. Diffusers may be of the vane type or of the duct type.

In general, these two types of diffuser comprise a radially-oriented annular upstream portion presenting a series of diffusion passages connected to the outlet of the compressor in order to recover the accelerated gas leaving it. These diffusion passages are of a section that increases progressively from upstream to downstream in order to diffuse the flow of gas leaving the compressor. Diffusers of the vane type make use of a series of circularly spaced-apart vanes forming the diffusion passages between one another. In duct type diffusers, the passages are constituted by duct or pipe elements, e.g. formed between two joined-together opposite plates.

Downstream from the upstream portion, diffusers generally include an elbow-shaped annular intermediate portion for curving the flow path of the diffuser and bringing the flow of gas towards the combustion chamber.

Downstream from the intermediate portion, diffusers generally comprise an annular downstream portion made up of a series of circularly spaced-apart flow-straightening vanes for straightening the flow of gas, and thus for reducing or eliminating the circumferential swirling of the flow of gas as it leaves the diffusion passages, prior to said flow entering into the combustion chamber.

In general, the centers of the injection orifices of the combustion chamber are distributed around the axis of the turbomachine on a circle of radius $R_1$, while the mean radius $R_2$ of the downstream portion of the diffuser is greater than the radius $R_1$.

In certain prior art turbomachines, the downstream portion of the diffuser follows the line of the outer casing of the chamber and is directed towards the outer zone that bypasses the chamber (i.e. the through zone between the chamber and the outer casing). In other words, in a section plane containing the axis of the turbomachine, the mean axis of the flow path at the outlet from the downstream portion of the diffuser is parallel to the mean axis of the bypass flow outside chamber. That solution is unsatisfactory since all of the main gas flow leaving the diffuser bypasses the combustion chamber on the outside prior to being shared between the outer flow and the flow that feeds both the chamber end wall and the inner bypass zone of the chamber (i.e. the through zone between the chamber and the inner casing). The injection systems and the inner bypass zone are then fed with a secondary flow diverted from the main flow, with such diversion giving rise to significant pressure drop (i.e. loss of pressure) between the outlet from the diffuser and the upstream end of the injection system, and between the outlet from the diffuser and the inner bypass zone.

The functional consequences of such pressure drop are the following:
- when designing the turbomachine, the large pressure drop between the outlet from the diffuser and the injection system needs to be compensated by an overall increase in the pressure drop of the module between the outlet from the diffuser and the outlet of the chamber so as to conserve a pressure drop on passing through the injection system that is sufficient to ensure air-fuel mixing and combustion. This increase in the pressure drop of the module gives rise to an increase in fuel consumption.
- the gas feed between the outer bypass zone and the inner bypass zone of the chamber is highly asymmetrical (the primary and dilution gas jets are more penetrating on the outside than on the inside), which makes it more difficult to control the temperature profile at the outlet from the chamber.
- the poor gas feed to the inner bypass zone leads to a reduction in the gas flow speeds in devices for cooling the inner wall of the combustion chamber, thereby reducing convective heat exchange coefficients, and thus reducing the overall efficiency of said cooling.
- poor gas feed to the inner bypass zone leads to a reduced overpressure ratio, decreasing the efficiency of the cooling of the turbine nozzle situated downstream from the chamber.

In order to avoid those drawbacks, in other prior art turbomachines, such as the machine of document FR 2 372 965, the downstream portion of the diffuser is inclined relative to the axis of the turbomachine towards the combustion chamber in such a manner that, in a section plane containing the axis of the turbomachine, the mean axis of the flow path at the outlet from the downstream portion of the diffuser passes via the chamber end wall between the maximum radius and the minimum radius of the chamber end wall. The flow path is defined as being the envelope that defines the flow space for the gas, and thus the gas flow. In the downstream portion of the diffuser, the flow path is defined by the inner outline of said downstream portion.

Such an inclination of the downstream portion of the diffuser relative to the axis of the turbomachine, towards the end wall of the chamber, constitutes an improvement since it reduces the pressure drop between the outlet from the diffuser and the upstream end of the injection system, by feeding these systems more directly. It also enables the outer and inner bypass zones of the chamber to be fed with gas in more symmetrical manner, and also provides a better gas feed to the inner bypass zone. Furthermore, the feed of gas to the various admission channels of each injection system is likewise more uniform.

OBJECT AND BRIEF SUMMARY OF THE INVENTION

The invention seeks to improve this type of turbomachine in order to further improve the feed to the injection systems.

To achieve this object, the invention provides a turbomachine of the above-specified type (i.e. having a downstream portion of the diffuser that is inclined relative to the axis of the turbomachine, towards the chamber end wall), in which the disposition of the flow-straightening vanes in the downstream portion of the diffuser, relative to the injection orifices (and thus to the injection systems placed in said orifices), is such that: in a section plane containing the axis of the turbomachine and passing via the center of one of said injection orifices, the curvilinear abscissa distance along a flow line between the middle of the flow path at the trailing edges of the flow-straightening vanes and said center is greater than or equal to three times the height of said flow path at the trailing edges of the flow-straightening vanes.

During the research that led to the invention, the inventors found that the flow-straightening vanes of the downstream portion of the diffuser give rise to disturbances in the flow of gas downstream from their trailing edges (a term used is "wake"), and that these disturbances have a harmful effect on the feed of gas to the injection systems. In particular, this gas feed is less symmetrical around the injection axis of each system. However, on going further away from the trailing edges of the flow-straightening vanes, these disturbances decrease. The invention thus proposes moving the injection orifices (and thus injection systems) far enough away from the trailing edges of the flow-straightening vanes to ensure that these orifices are in a zone of little disturbance, or indeed no disturbance, thereby improving the feed to the injection systems.

By means of the invention, it is found that the injection systems are fed better (in particular more symmetrically about the injection axis), thus making it possible in particular to improve the stability of combustion at low speeds, to have better control over the temperature profile at the outlet from the chamber, and to limit any risk of non-steady coupling between the combustion and the flow at the outlet from the diffuser.

Nevertheless, the injection orifices must not be too far away from the flow-straightening vanes, in order to limit pressure drops by spreading between the outlet from the diffuser and the upstream of the injection system. Thus, in an embodiment of the invention, in a section plane containing the axis of the turbomachine and passing through the center of one of said injection orifices, the curvilinear abscissa distance along a flow line between the middle of the flow path at the trailing edges of the flow-straightening vanes and said center is less than or equal to nine times the height of the flow path at the trailing edges of the flow-straightening vanes.

In order to improve the straightening of the gas flow passing through the downstream portion of the diffuser, it is preferable for the number of flow-straightening vanes to be large, but without that giving rise to aerodynamic blocking that would be harmful to the pumping margin of the centrifugal stage. Thus, in an embodiment of the invention, the number of flow-straightening vanes is greater than the number of injection systems. Preferably, the number of flow-straightening vanes is at least four times the number of injection systems. With increasing number of flow-straightening vanes, the number of turbulent structures induced by the vanes are likewise increased (but they are of smaller size), thereby making the invention more advantageous, since it enables these turbulent structures to be dissipated over the recommended distance between the trailing edges of the flow-straightening vanes and the injection orifices.

BRIEF DESCRIPTION OF THE DRAWINGS

The invention and its advantages can be better understood on reading the following detailed description of embodiments of the invention given by way of nonlimiting illustration. The description makes reference to the accompanying figures, in which.

MORE DETAILED DESCRIPTION

Figure 1:
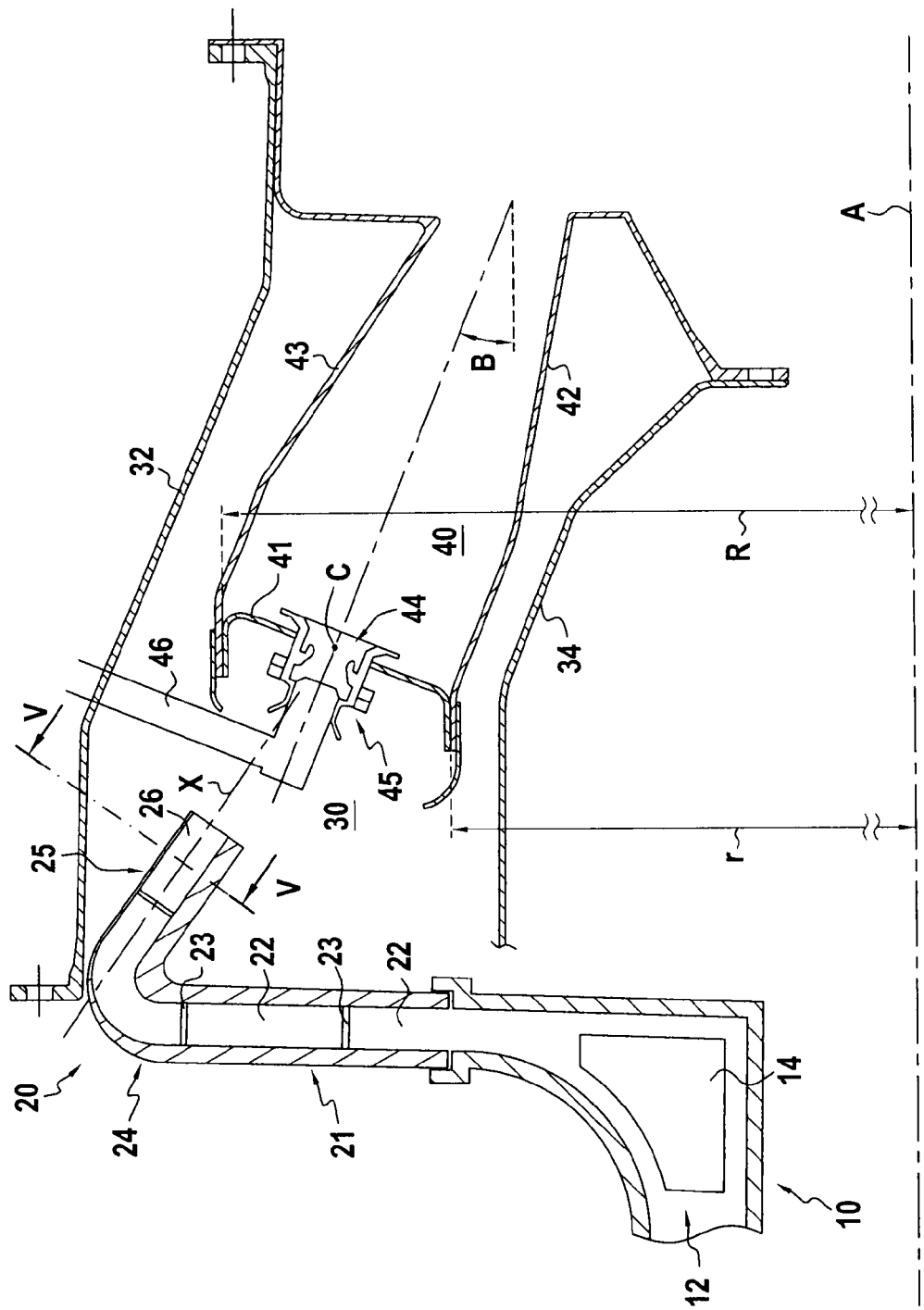
FIGS. 1 to 3 are diagrammatic axial half-section views showing the compressor, the diffuser, and the combustion chamber module in three examples of airplane turbojets in accordance with the invention.
Figure 2:
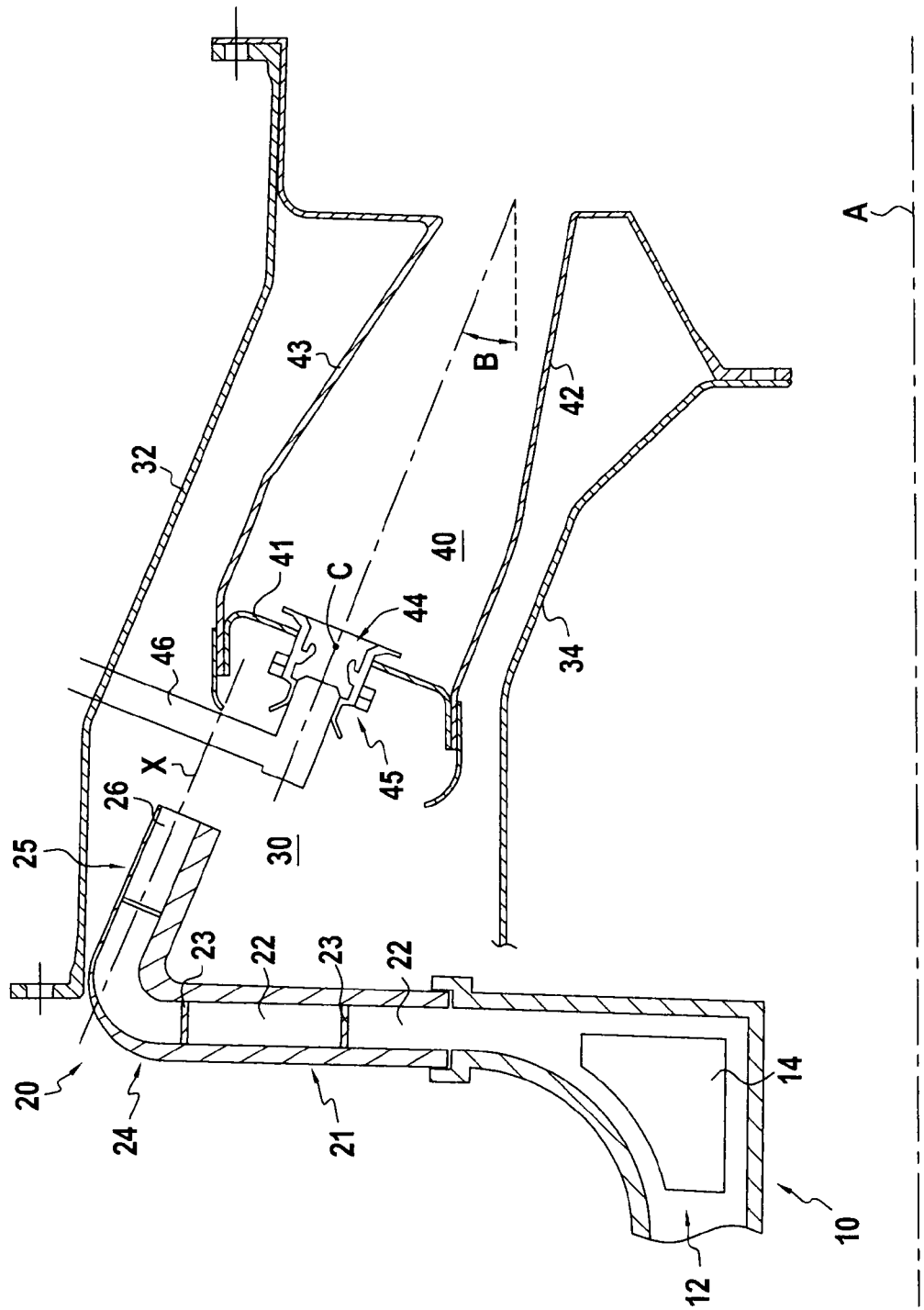
Figure 3:
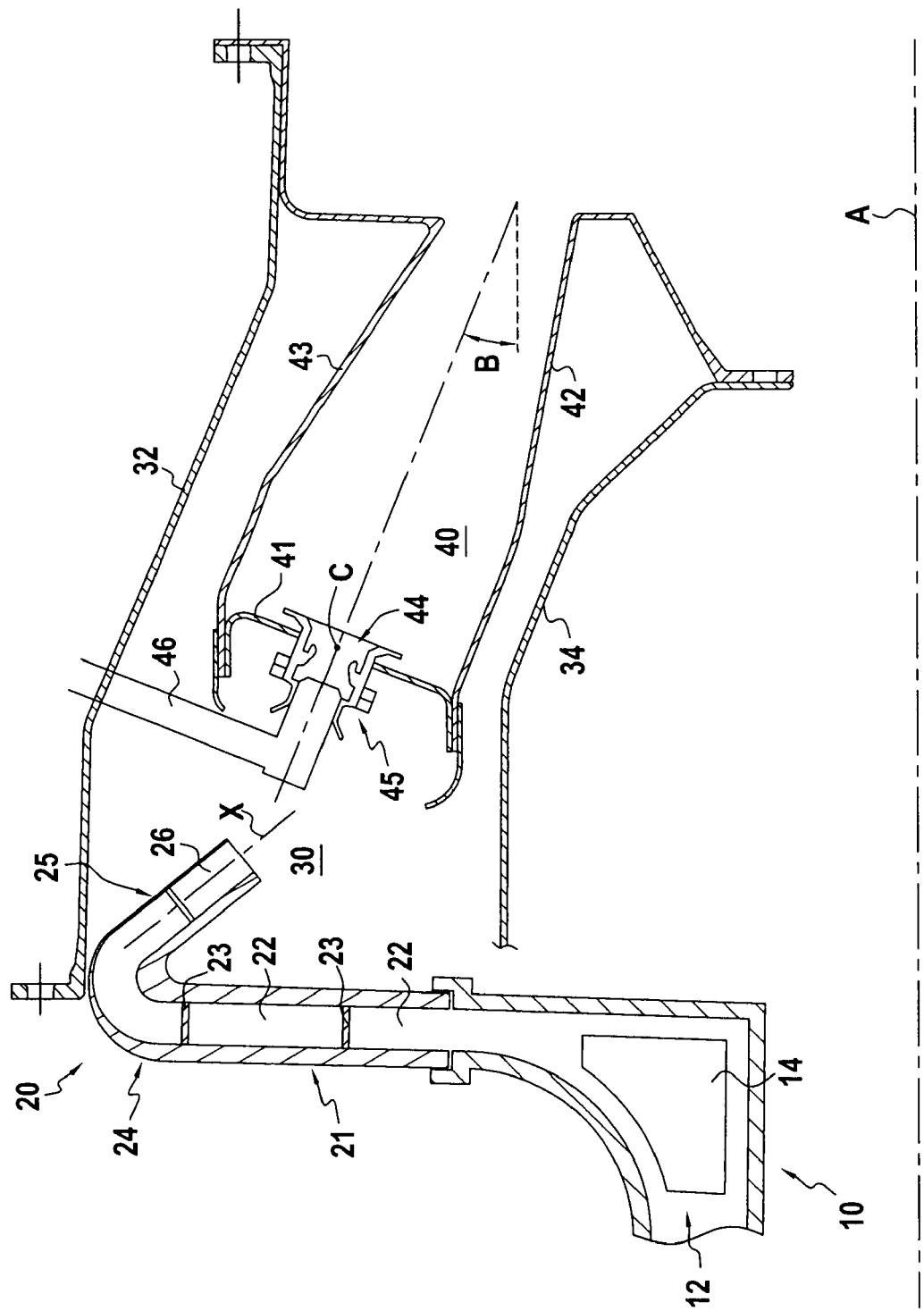

FIGS. 1 to 3 show an example of a turbojet in axial half-section on a section plane containing the axis of rotation A of the rotor of the turbojet.

The gas passing through the turbojet is air.

The turbojet comprises a high-pressure compressor 10 having a downstream portion (visible in FIGS. 1 to 3) that is constituted by a centrifugal stage, and an annular diffuser 20 connected downstream from the compressor 10, said diffuser opening out into a space 30 surrounding an annular combustion chamber 40. The space 30 is defined by an outer casing 32 and an inner casing 34 that are concentric. The combustion chamber 40 is supported by fastener flanges that are connected to the casings 32 and 34.

The centrifugal compressor 10 comprises a rotary impeller 12. The impeller 12 comprises a series of moving blades 14 that are driven in rotation. The impeller 12 is made in such a manner as to accelerate the air passing through it, and as a result to increase the kinetic energy of said air.

The diffuser 20 presents an annular space surrounding the impeller. The diffuser 20 serves to reduce the speed of the air leaving the impeller, and as a result to increase its static pressure. The diffuser 20 shown in the figures is of the bladed type.

The diffuser 20 has a radially-oriented annular upstream portion 21 that presents a series of diffusion passages 22 connected to the outlet from the compressor 20 in order to recover the accelerated air leaving the impeller 12. These diffusion passages 22 are of a section that increases progressively from upstream to downstream so as to diffuse the flow of air leaving the impeller. The diffusion passages 22 are formed by a series of circularly spaced-apart vanes 23. At the entry to the upstream portion 21, these vanes are close to one another. These vanes 23 diverge circumferentially apart from one other on approaching the outlet from the upstream portion 21.

Downstream from the upstream portion 21, the diffuser 20 has an elbow-shaped annular intermediate portion 24 for curving the flow path of the diffuser and for bringing the flow of air towards the combustion chamber 40.

Figure 5:
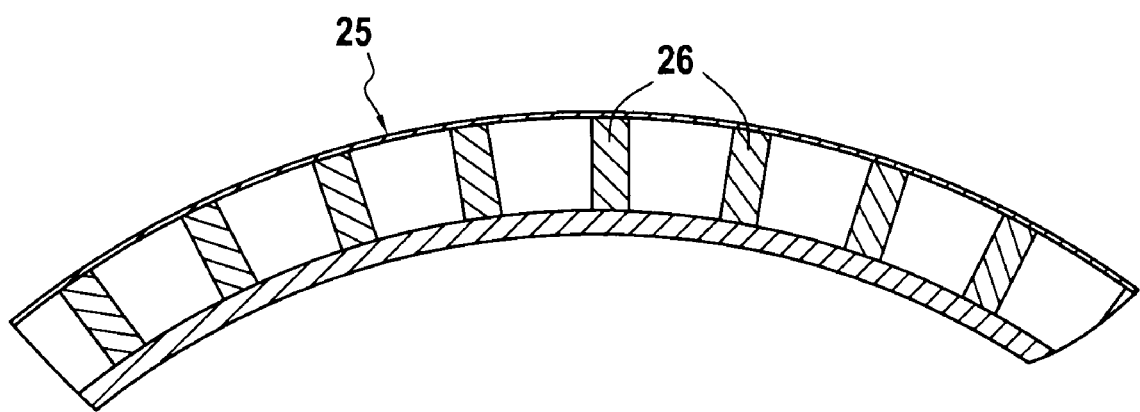
FIG. 5 shows part of the downstream portion of the diffuser of the FIG. 1 turbomachine in radial section, on section plane V-V.

Downstream from this intermediate portion 24, the diffuser 20 has an annular downstream portion 25 comprising a series of circularly spaced-apart flow-straightening vanes 26 for reducing or limiting the circumferential swirling of the flow of air leaving the diffusion passages 22 before this flow of air enters the space 30. FIG. 5 shows the flow-straightening vanes 26 in section in a section plane perpendicular to the mean axis X of the flow path at the outlet from the downstream portion 25 of the diffuser. As can be seen in this figure, the flow-straightening vanes 26 extend radially between the inner and outer walls of the downstream portion 25 of the diffuser.

The combustion chamber 40 comprises an annular inner wall 42, an annular outer wall 43, and an annular chamber end wall 41 disposed between said inner and outer walls 42 and 43 in the upstream region of said chamber. The chamber end wall 41 presents injection orifices 44 that are distributed circularly around the axis A. Injection systems 45 are mounted on the chamber end wall through said injection orifices 44 (there being one injection system 45 per injection orifice 44). These injection systems 45 enable the air/fuel mixture to be injected for burning in the combustion chamber 40. The fuel in the mixture is delivered to the injection systems 45 by a fuel feed pipe 46 passing through the space 30.

The assembly constituted by the combustion chamber 40, its casings, and its immediate environment is commonly referred to as the combustion chamber module.

The combustion chamber 40 is inclined relative to the axis A of the turbojet by a (non-zero) acute angle B. The greater this acute angle B, the shorter the axial extent of the combustion chamber module.

In order to ensure that the flow of air leaving the diffuser 20 is directed towards the injection systems 45, the downstream portion 25 of the diffuser 20 is inclined relative to the axis A of the turbojet towards the combustion chamber in such a manner that in a section plane containing the axis of the turbojet, the mean axis X of the flow path at the outlet from the downstream portion 25 of the diffuser passes via the chamber end wall 41 between the maximum radius R and the minimum radius r of the chamber end wall 41. Since the chamber end wall 41 is annular and centered on the axis A, the radii r and R extend from the axis A in a radial direction. To illustrate this, FIGS. 1 to 3 show three examples of a combustion chamber 40 in which the above-specified inclination criterion is satisfied. In FIG. 2, the mean axis X of the flow path at the outlet from the downstream portion 25 of the diffuser passes via the chamber end wall 41 close to the maximum radius R. In FIG. 3, the mean axis X of the flow path at the outlet from the downstream portion 25 of the diffuser passes via the chamber end wall 40 close to the minimum radius r. In FIG. 1, the mean axis X of the flow path at the outlet from the downstream portion 25 of the diffuser passes through the chamber end wall 41 close to the center C of an injection orifice 44.

Figure 4:
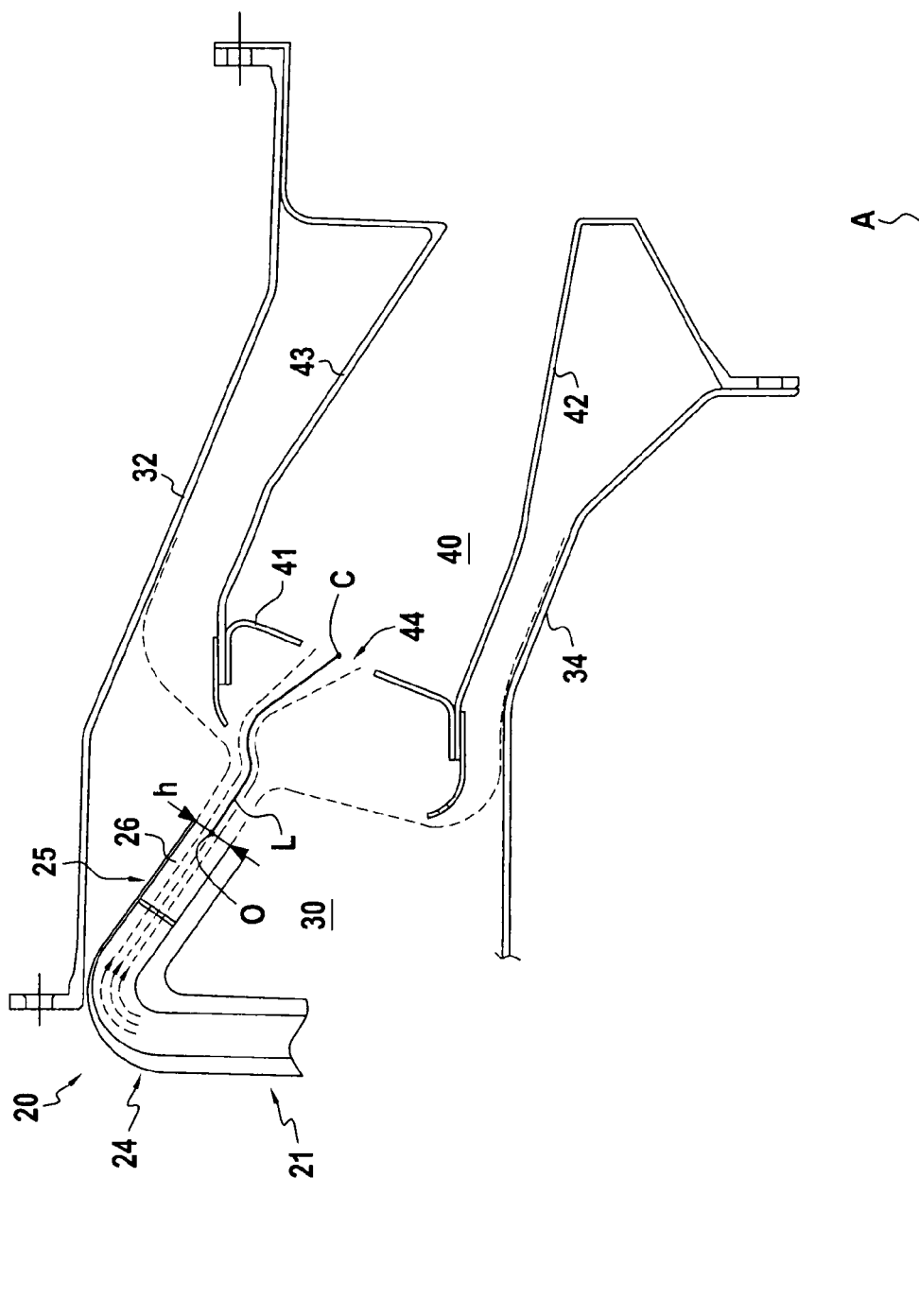
FIG. 4 shows the combustion chamber module of FIG. 1, together with the flow lines of gas passing through the module.

In accordance with the invention and with reference to FIG. 4 that shows the combustion chamber module of FIG. 1 together with the flow lines of the air passing through the module, it can be seen, in the section plane of FIGS. 1 and 4 that contains the axis A of the turbojet and that passes through the center C of an injection orifice 44, that the curvilinear abscissa distance along the flow line L between the middle O of the flow path at the trailing edges of the flow-straightening vanes 26 and said center C (i.e. the length of the portion of curve belonging to the flow line L and going from O to C), is greater than or equal to three times the height h of the flow path at the trailing edges of the flow-straightening vanes (where this height h corresponds to the height of the flow-straightening vanes 26). Furthermore, this curvilinear abscissa distance is less than or equal to nine times the height of said flow path at the training edges of the flow-straightening vanes.

What is claimed is:

1. A turbomachine comprising
an annular combustion chamber with a chamber end wall presenting injection orifices having injection systems mounted therein;
a compressor having a centrifugal downstream stage; and
an annular diffuser enabling the gas flow leaving the compressor to be diffused and directing said flow of gas towards said injection systems, the diffuser comprising:
a radially-oriented upstream portion that presents diffusion passages connected to the outlet of the compressor; an elbow-shaped intermediate portion; and a downstream portion comprising a series of circularly spaced apart flow-straightening vanes, the downstream portion being inclined relative to the axis of the turbomachine towards the combustion chamber, in such a manner that in the section plane containing the axis of the turbomachine, the mean axis of the flow path at the outlet from the downstream portion of the diffuser passes through the chamber end wall between the maximum radius and the minimum radius of the chamber end wall;
the turbomachine being such that, in the section plane containing the axis of the turbomachine and passing via the center of one of said injection orifices, the curvilinear abscissa distance along a flow line between the middle of the flow path at the trailing edges of the flow-straightening vanes and said center, is greater than or equal to three times the height of said flow path at the trailing edges of the flow-straightening vanes, and such that the number of flow-straightening vanes is at least four times greater than the number of injection systems.

2. The turbomachine according to claim 1, in which, in a section plane containing the axis of the turbomachine and passing via the center of one of said injection orifices, the curvilinear abscissa distance along a flow line between the middle of the flow path at the trailing edges of the flow-straightening vanes and said center is less than or equal to nine times the height of said flow path at the trailing edges of the flow-straightening vanes.

* * * * *